Nov. 2, 1937.  C. F. WALLACE  2,097,850

SEALING JOINT AND METHOD OF MAKING THE SAME

Filed Aug. 10, 1935

Charles F. Wallace
INVENTOR.

BY
Cooper, Kerr & Dunham
his ATTORNEYS

Patented Nov. 2, 1937

2,097,850

UNITED STATES PATENT OFFICE 2,097,850

SEALING JOINT AND METHOD OF MAKING THE SAME

Charles F. Wallace, Westfield, N. J., assignor to Wallace & Tiernan Products, Inc., Belleville, N. J., a corporation of New Jersey Application August 10, 1935, Serial No. 35,686

16 Claims. (Cl. 88—57)

This invention relates to methods of and means for effecting a fluid tight seal between members which expand or contract unequally when in use, as the joining of metal shapes to porcelain, ceramic ware or glass.

One of the objects of the invention is to provide a fluid tight seal, such as a gas and/or moisture tight seal, between members which expand or contract unequally when in use.

Another object is to provide a method of making such a seal.

Other objects and advantages will appear upon reading the following written description of the preferred form of my invention and the principle thereof, and the best mode in which I have contemplated applying that principle.

Referring to the drawing which illustrates what I now consider a preferred embodiment of my invention:

Figure 1:
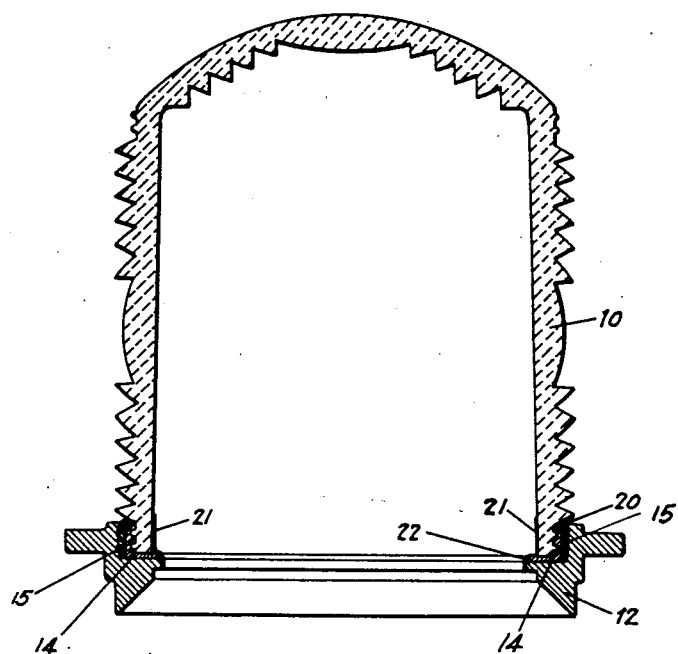
Fig. 1 is a sectional elevation of a lens mount.
Figure 2:
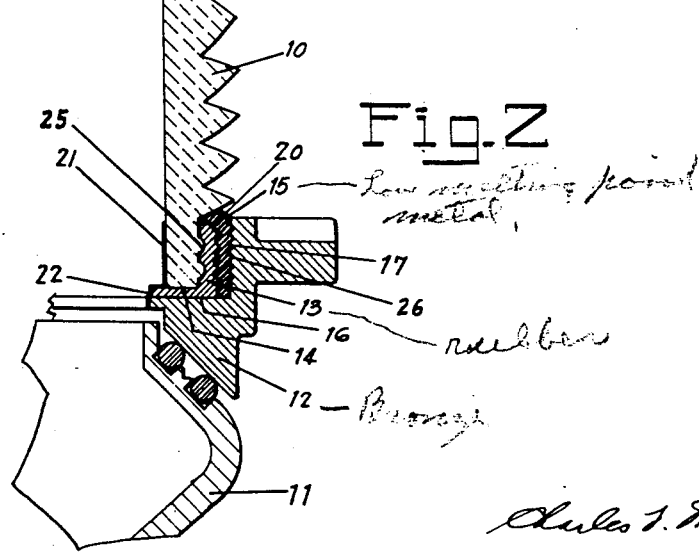
Fig. 2 is an enlarged detail sectional elevation thereof, showing a part of a housing not shown in Fig. 1.

While my invention may be employed in other apparatus, for other uses, and in other environments, within the scope of appended claims, many of its advantageous features adapt it especially for use in beacons, both stationary and in buoys, embodying Fresnel lenses, to which I shall now refer.

A type of beacon now in use comprises a casing or housing surmounted by a lens which is generally cylindrical in shape. Within the lens is mounted an electric lamp or light source, and within the housing there is a motor driven automatic switch mechanism for flashing the lamp according to a predetermined program. It is important that the emitted light be substantially uniformly distributed in a horizontal plane and a special lamp has been invented whereby desired uniformity of distribution from the lamp is attained. Such a lamp is disclosed in the application filed by Lawrence G. Sovulewski and George M. Booth on July 6, 1934, Serial No. 733,968, for Letters Patent of the United States. The motor driven automatic switch mechanism need not be here described in detail since reference to United States Letters Patent No. 1,985,357, patented December 25, 1934, on my application, may be made for a full disclosure of such mechanism.

In such a buoy, embodying the above mentioned lamp and mechanism, it is important that the lens be maintained intact and that the joint between the lens and housing be tight at all times; otherwise moisture or water will enter the lens and housing and thereby seriously damage and even ruin the comparatively delicate apparatus enclosed by the lens and housing. Worse still, if the lens breaks or the joint of the lens mount becomes loose, the apparatus may be thereby put out of commission, a ship may get out of the channel and great damage and even loss of life result. The problem of providing a satisfactory lens mount is complicated by a number of factors. The lens is commonly made of glass and mounted in a metallic support so that provision must be made to permit expansion and contraction of the glass without breakage of the glass or loosening of the joint. Heretofore assemblies of lenses to metal supports or housings have been sealed with relatively nonelastic materials such as white lead, putty, litharge and the like, or else a clamping ring has been placed over the top of the lens and tie rods attached to this to allow clamping the lens down against gaskets. In those cases where a closed top lens has been used, i. e., a lens which is made of one piece of glass with only the lower end open, the jointing material has been necessary only at the lower end of the lens. In the case of an open top lens, usually the same method of sealing is used at both the top and bottom ends of the lens. Due to the lack of elasticity of the bonding materials employed in the method first cited and the different coefficients of expansion involved, the joints tended to become loose after being in service for a short time. When tie rods have been employed, they seriously obstructed the light admitted through the lens and interfered with the desired uniformity of distribution.

My invention provides a lens mount which is durable, permits expansion and contraction of the lens without injury thereto, has the desired tightness of joint, and has great mechanical strength.

A lens of the type referred to, i. e. a Fresnel lens, is shown at 10. It is of the general shape of an inverted cylindrical cup and made of glass. The housing is partially shown at 11 and has suitably secured thereto the ring 12 of bronze. I provide the following sealing means between the lens 10 and the ring 12.

An annulus 13 of non-oxidizing soft rubber surrounds the bottom portion of the lens 10 and, preferably, is provided with a flange 14 interposed between the bottom edge of the lens 10 and the ring 12. A second annulus, 15, surrounds the periphery of the annulus 13 and is, in turn, surrounded by the ring 12.

A preferred method of constructing the seal is as follows.

The bottom edge and the lower peripheral or outer surface of the lens 10 is coated with a vulcanizing cement, various types of which are obtainable in the open market and which are familiar to those skilled in the art of vulcanization. One of such cements is known to the trade as Vulcolock. The lens is the placed on a steam table (or in an oven) the temperature of which is maintained at about 250° F. The horizontal inner surface 16 of the annulus 12 is coated with vulcanizing rubber cement and placed on the steam table (or in an oven). When the lens 10 and the ring 12 have assumed the approximate temperature of the steam table, the vertical inner surface 17 of the annulus 12 is treated by washing with a cyanide (KCN) solution which is used as a flux to prepare the surface of the ring for union with the molten metal 15. The soft rubber annulus 13 is then coated on all surfaces with Vulcolock or other suitable rubber cement and snapped over the previously coated lower end of the lens 10. The assembled lens 10 and annulus 13 are now placed concentrically in and on the lens ring or annulus 12 on the steam table and held in this position by any suitable means, such as a suitable spring or weight, pressing down on the top of the lens 10. The rubber cement is thus dried, in about ten minutes or so. Molten metal is then poured between the annulus 13 and ring or annulus 12 (while the assembled lens 10, ring 12 and annulus 13 are still on the steam table) to form the annulus 15, and the completed assemblage is allowed to cool, preferably gradually, to room temperature.

The metal I prefer to employ in making the annulus 15 is a fusible metal or soft metal alloy with a comparatively low melting point, say 180° F., and may consist of

| | Percent |
|---|---|
| Lead | 35.15 |
| Tin | 20.03 |
| Bismuth | 35.31 |
| Cadmium | 9.51 | percentages by weight. Such an alloy withstands the temperatures incident to ordinary use of the invention and yet its melting point is of such low order as to facilitates casting and assembly and to avoid injury, during casting, to other parts of the assemblage.

The above method is the now preferred method; a variation is to substitute the use of vulcanizing rubber cement on the vertical surface 17 of the ring 12 and the metal annulus 15 instead of a metallic bond between the two metals.

After the parts have cooled to room temperature, I prefer to apply a protective coating of a suitable opaque lacquer to the exposed surface or upper edge 20 of the annulus 15; and to the inner surface 22 of the annulus 13, and to the lower inner surface 21 of the lens 10. This coating serves the double purpose of preventing corrosion and protecting the rubber annulus 13 from possible deterioration due to light.

The effectiveness of the joint is enhanced by providing ribs or corrugations 25 on the lower outer surface of the lens 10 and by suitably corrugating or roughening the inner surface 26 of the annulus or ring 12.

In view of the foregoing it will now be appreciated that I have provided a yielding or flexible seal which is tight, durable, resistant, to corrosion, and which greatly reduces the likelihood of breakage or other injury to parts.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

What I claim is:

1. A joint for connecting spaced members of which at least one is frangible, comprising an element of resilient material in the space between said members, and a metallic element of low melting point in the space between said members and sealing said resilient element against outer exposure.

2. In combination, a lens, a support therefor spaced therefrom, a resilient element in the space between the lens and its support, and a metallic seal of low melting point in the space between said lens and its support.

3. In combination, a substantially cylindrical lens, an annular support into which an open end of said lens extends, a resilient annulus surrounding the last mentioned end of said lens, and an annular sealing member of low melting point metal between said resilient annulus and said support.

4. In combination, a lens, a support therefor spaced therefrom, resilient means in the space between said lens and its support, and a sealing member in the space between said lens and its support and consisting of metal having a melting point below that at which said resilient means becomes impaired and above maximum atmospheric temperature.

5. In combination, a Fresnel lens, an annulus of live rubber surrounding an open end of said lens and cemented thereto, a support surrounding said annulus, and a metallic sealing member cast between said annulus and support.

6. An expansion joint lens-mount comprising a live rubber cushion and a filler of fusible metal in contact with said cushion.

7. The method of making a sealing joint between spaced members having different coefficients of expansion which comprises interposing resilient material in the space between said members, and casting metal in the space between said members and in contact with said resilient material.

8. The method of making a lens mount which comprises surrounding a lens with live rubber and cementing the same thereto, and casting a filler of fusible metal between the rubber and a support.

9. A joint for connecting spaced members of which at least one is frangible, comprising a resilient element of resilient material in the space between said members, and a metallic element of low melting point in the space between said members and surrounding and sealing said resilient element against outer exposure.

10. In combination, a lens, a support therefor, a live rubber element between the lens and its support, and a metallic seal of low melting point in contact with said resilient element between said lens and its support.

11. In combination, a substantially cylindrical lens, an annular support into which an open end of said lens extends, a live rubber annulus surrounding the last mentioned end of said lens, and an annular sealing member of low melting point metal between said live rubber annulus and said support.

12. In combination, a lens, a spaced support therefor, resilient means in the space between said lens and its support, and a second member in the said space between said lens and its support, said second mentioned member consisting of metal having a melting point below that at which said resilient means becomes impaired and above maximum atmospheric temperature, and constituting a sealing member for the resilient means and in contact therewith.

13. In combination, a frangible member, a spaced support therefor, resilient means in the space between said member and its support, and a second member in the said space between said first mentioned member and its support, said second mentioned member consisting of metal having a melting point below that at which said resilient means becomes impaired and above maximum atmospheric temperature.

14. In combination, a Fresnel lens, an annulus of live rubber surrounding an open end of said lens and cemented thereto, a support surrounding said annulus, and a metallic sealing member of low melting point cast between said annulus and support and sealing said annulus against outer exposure.

15. The method of making a sealing joint between spaced members having different coefficients of expansion which comprises interposing resilient material in the space between said members, and casting metal in the space between said members and in contact with said resilient material while maintaining the resilient characteristics and functions of the said resilient material.

16. The method of making a lens mount which comprises surrounding a lens with live rubber and cementing the same thereto, and casting a filler of fusible metal between the rubber and a support while maintaining the rubber intact.

CHARLES F. WALLACE.